(12) United States Patent
Hastings et al.

(10) Patent No.: US 11,895,394 B2
(45) Date of Patent: Feb. 6, 2024

(54) PRIVACY CONTROLS FOR CAMERAS IN HEALTHCARE ENVIRONMENTS

(71) Applicant: Stryker Corporation, Kalamazoo, MI (US)

(72) Inventors: Sean Victor Hastings, Flower Mound, TX (US); Lida Anne Robinson, Forth Worth, TX (US); Robert Lee York, Lantana, TX (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/489,742

(22) Filed: Sep. 29, 2021

(65) Prior Publication Data

US 2022/0103760 A1 Mar. 31, 2022

Related U.S. Application Data

(60) Provisional application No. 63/085,939, filed on Sep. 30, 2020.

(51) Int. Cl.
*H04N 23/63* (2023.01)
*G06F 21/83* (2013.01)
*H04N 5/262* (2006.01)
*H04N 5/272* (2006.01)
*H04N 23/661* (2023.01)
*G06F 21/62* (2013.01)

(52) U.S. Cl.
CPC ....... *H04N 23/635* (2023.01); *G06F 21/6263* (2013.01); *G06F 21/83* (2013.01); *H04N 5/2628* (2013.01); *H04N 5/272* (2013.01); *H04N 23/661* (2023.01)

(58) Field of Classification Search
CPC ......... H04N 5/232945; H04N 5/23206; H04N 5/2628; H04N 5/272; H04N 5/23219; H04N 2205/2726; H04N 23/635; H04N 23/661; H04N 23/62; G06F 21/6263; G06F 21/83; G06F 21/6254
See application file for complete search history.

(56) References Cited

U.S. PATENT DOCUMENTS

| | | | | |
|---|---|---|---|---|
| 10,325,374 | B1* | 6/2019 | Mayer | G06V 10/443 |
| 11,176,311 | B1* | 11/2021 | Lorenzo | G06F 40/117 |
| 2012/0140068 | A1* | 6/2012 | Monroe | H04N 7/183 |
| | | | | 348/143 |
| 2012/0281970 | A1* | 11/2012 | Garibaldi | H04N 21/2665 |
| | | | | 348/E7.083 |
| 2013/0169781 | A1* | 7/2013 | Hanina | G16H 30/40 |
| | | | | 348/77 |
| 2013/0342851 | A1* | 12/2013 | Dresel | G01B 11/24 |
| | | | | 356/601 |
| 2019/0268537 | A1* | 8/2019 | Jang | G06F 21/32 |
| 2020/0404221 | A1* | 12/2020 | Trundle | G06F 21/6245 |

(Continued)

*Primary Examiner* — Kelly L Jerabek
(74) *Attorney, Agent, or Firm* — Morrison & Foerster LLP

(57) ABSTRACT

Disclosed are methods and systems that can maintain patient privacy in a video stream of a medical facility by obfuscating all patient identity information such that the patient's identity and medical information is protected. In addition, the system and methods disclosed herein can limit the change in the perspective of the camera based on a defined privacy zone in the medical facility such that the privacy zone is not in the field of view of the camera.

23 Claims, 6 Drawing Sheets

(56) References Cited

U.S. PATENT DOCUMENTS

| | | | |
|---|---|---|---|
| 2021/0037177 A1* | 2/2021 | Kuroda | H04N 5/23222 |
| 2021/0065856 A1* | 3/2021 | Meyerson | H04L 67/12 |
| 2021/0202052 A1* | 7/2021 | Bechtel | G16H 10/60 |
| 2021/0240853 A1* | 8/2021 | Carlson | G16H 10/20 |
| 2022/0229919 A1* | 7/2022 | Klabunde | H04L 65/403 |

* cited by examiner

200

202 – Define at least one privacy zone for a portion of a medical facility, wherein the at least one privacy zone is associated with patient privacy

204 – Receive image data from an image data source, wherein the image data includes at least one portion of the at least one privacy zone

206 – Modify the image data to obfuscate the at least one portion of the at least one privacy zone

208 – Transmit the image data in which the at least one portion of the at least one privacy zone is obfuscated

302 – Define at least one privacy zone for a portion of a medical facility, wherein the at least one privacy zone is associated with patient privacy 304 – Receive image data from an image data source having a first perspective, wherein a perspective of the image data source can be remotely controlled 306 – Receive a first user input corresponding to a remotely controlled change in the perspective of the image data source to a second perspective 308 – Limit the change in the perspective of the image data source based on the defined at least one privacy zone so that the at least one privacy zone is not in a field of view of the image data source

FIG. 3

PRIVACY CONTROLS FOR CAMERAS IN HEALTHCARE ENVIRONMENTS

CROSS-REFERENCE TO RELATED APPLICATIONS

This application claims the benefit of U.S. Provisional Application No. 63/085,939, filed Sep. 30, 2020, the entire contents of which are hereby incorporated by reference herein.

FIELD

This relates generally to methods and systems of maintaining patient privacy, and more specifically to systems and methods for maintaining patient privacy in a video of a medical facility by limiting the change in perspective of the imaging device or obfuscating the video based on a defined privacy zone.

BACKGROUND

Almost all hospitals utilize some form of video monitoring systems to view activity and monitor patients within various parts of the medical facility such as operating rooms and other hospital rooms. In addition, records of these videos are sometimes used after the fact for educational, safety, or other various reasons. In addition, healthcare institutions are responsible for strictly maintaining patient privacy and confidentiality. Allowing videos that contain patient identity information (which also includes patient medical information) to be streamed or recorded to people who are not their healthcare providers would be a violation of the patient's privacy rights.

SUMMARY

As described above, maintaining patient's privacy is of upmost importance in medical facilities. Currently, some hospitals cover an area of the camera or an area of the medical facility that they do not want to be viewed. In addition, some hospitals also may block the camera completely. Applicant has discovered methods and systems that can maintain patient privacy in a video stream of a medical facility by obfuscating all patient identity information such that the patient's identity and medical information is protected. Although the majority of the information protected in this application is referred to as "patient" information, the "patient" can also be replaced or combined with that of a health care provider throughout this application. As such, it can also be important to protect the identity and additional information of a health care provider who may be performing a medical procedure on a patient.

In addition, some of the cameras in a medical facility may have far end camera controls. Far end camera controls can allow someone in a location other than the camera's location to take control of the camera and change the perspective (e.g., pan, tilt, zoom functionality) of the camera. This person at the far end controls may not be authorized to see patient identity information (which can also include patient medical information). As such, Applicant's system can limit the change in the perspective of the camera based on a defined privacy zone in the medical facility such that the privacy zone is not in the field of view of the camera. In some embodiments, the system can instead obfuscate the privacy zone such that the user at the far end control of the camera cannot see any patient identity information. Use of the systems, methods, and techniques described herein can protect patients' privacy rights from any patient identity information being leaked to unauthorized people through healthcare video monitoring and/or recording systems.

In some embodiments, a method of maintaining patient privacy in video of a portion of a medical facility includes: defining at least one privacy zone for the portion of the medical facility, wherein the at least one privacy zone is associated with patient privacy; capturing, via an image data source, a video stream that includes at least one portion of the at least one privacy zone; modifying the video stream to obfuscate the at least one portion of the at least one privacy zone; and transmitting the video stream in which the at least one portion of the at least one privacy zone is obfuscated. In some embodiments, defining the at least one privacy zone comprises receiving a user input to define the at least one privacy zone. In some embodiments, the user input comprises selecting the at least one privacy zone on a display displaying a video stream of the portion of the medical facility. In some embodiments, defining the at least one privacy zone comprises receiving a user input associated with the at least one privacy zone and detecting one or more edges in the video stream, wherein the one or more edges provide a reference point to define the at least one privacy zone. In some embodiments, defining the at least one privacy zone comprises identifying a visual indicator in the video stream via image processing. In some embodiments, the visual indicator comprises a human face, a video display, or an object with written text. In some embodiments, the visual indicator comprises an infrared light. In some embodiments, the visual indicator comprises a quick-read code. In some embodiments, the at least one privacy zone is defined as a region centered around the visual indicator. In some embodiments, the region can be a circle. In some embodiments, defining the at least one privacy zone comprises receiving a first input from one or more sensors of an object in the portion of the medical facility. In some embodiments, the object comprises a surgical table. In some embodiments, the first input corresponds to a position of a patient. In some embodiments, the first input corresponds to a position of the object within the portion of the medical facility.

In some embodiments, a system for maintaining patient privacy in video of a portion of a medical facility includes one or more processors configured to: receive a first input; define, based on the first input, at least one privacy zone for the portion of the medical facility, wherein the at least one privacy zone is associated with patient privacy; receive a video stream generated by an image data source, wherein the video stream includes at least one portion of the at least one privacy zone; modify the video stream to obfuscate the at least one portion of the at least one privacy zone; and transmit the video stream in which the at least one portion of the at least one privacy zone is obfuscated. In some embodiments, the first input comprises selecting the at least one privacy zone on a display displaying a video stream of the portion of the medical facility. In some embodiments, defining the at least one privacy zone comprises receiving a first input associated with the at least one privacy zone and detecting one or more edges in the video stream, wherein the one or more edges provide a reference point to define the at least one privacy zone. In some embodiments, defining the at least one privacy zone comprises identifying a visual indicator in the video stream via image processing. In some embodiments, the visual indicator comprises a human face, a video display, or an object with written text. In some embodiments, the visual indicator comprises an infrared light. In some embodiments, the visual indicator comprises a quick-read code. In some embodiments, the at least one privacy zone is defined as a region centered around the visual indicator. In some embodiments, the region can be a circle, square, oval, or any other shape. In some embodiments, defining the at least one privacy zone comprises receiving the first input from one or more sensors of an object in the portion of the medical facility. In some embodiments, the object comprises a surgical table. In some embodiments, the first input corresponds to a position of a patient. In some embodiments, the first input corresponds to a position of the object within the portion of the medical facility.

In some embodiments, a method of maintaining patient privacy in video of a portion of a medical facility includes: defining at least one privacy zone for the portion of the medical facility, wherein the at least one privacy zone is associated with patient privacy; generating a video stream via an image data source from a first perspective, wherein a perspective of the image data source can be remotely controlled; receiving a first user input corresponding to a remotely controlled change in the perspective of the image data source to a second perspective; limiting the change in the perspective of the image data source based on the defined at least one privacy zone so that the at least one privacy zone is not in a field of view of the image data source. In some embodiments, the method further comprising receiving a second user input, and wherein the at least one privacy zone is defined based on the second user input. In some embodiments, the second user input corresponds to a range of motion of the image data source. In some embodiments, the method further comprising displaying the video stream from the first perspective, wherein the user second input corresponds to a region of the video stream. In some embodiments, the method further comprising determining whether the first user input is received from an authorized user or an unauthorized user; and limiting the change in the perspective of the image data source based on the defined at least one privacy zone so that the at least one privacy zone is not in a field of view of the image data source in response to determining that the first user input is received from an unauthorized user. In some embodiments, limiting the change in perspective comprises limiting a panning range of the image data source. In some embodiments, limiting the change in perspective comprises limiting a tilting range of the image data source. In some embodiments, limiting the change in perspective comprises limiting a zoom range of the image data source.

In some embodiments, a system for maintaining patient privacy in video of a portion of a medical facility includes one or more processors configured to: define at least one privacy zone for the portion of the medical facility, wherein the at least one privacy zone is associated with patient privacy; receive a video stream from an image data source having a first perspective, wherein a perspective of the image data source is remotely controlled; receive a first user input corresponding to a remotely controlled change in the perspective of the image data source to a second perspective; limit the change in the perspective of the image data source based on the defined at least one privacy zone so that the at least one privacy zone is not in a field of view of the image data source. In some embodiments, defining the at least one privacy zone comprises receiving a user input to define the at least one privacy zone. In some embodiments, the user input comprises selecting the at least one privacy zone on a display displaying a video stream of the portion of the medical facility. In some embodiments, defining the at least one privacy zone comprises receiving a user input associated with the at least one privacy zone and detecting one or more edges in the video stream, wherein the one or more edges provide a reference point to define the at least one privacy zone. In some embodiments, defining the at least one privacy zone comprises identifying a visual indicator in the video stream via image processing. In some embodiments, the visual indicator comprises a human face, a video display, or an object with written text. In some embodiments, the visual indicator comprises an infrared light. In some embodiments, the visual indicator comprises a quick-read code. In some embodiments, the at least one privacy zone is defined as a region centered around the visual indicator. In some embodiments, defining the at least one privacy zone comprises receiving a first input from one or more sensors of an object in the portion of the medical facility. In some embodiments, the object comprises a surgical table. In some embodiments, the first input corresponds to a position of a patient. In some embodiments, the first input corresponds to a position of the object within the portion of the medical facility.

In some embodiments, a method of maintaining patient privacy in a video of a portion of a medical facility includes: defining at least one privacy zone for the portion of the medical facility, wherein the at least one privacy zone is associated with patient privacy; capturing, via an image data source having a perspective, a video stream that includes at least one portion of the at least one privacy zone; transmitting the video stream comprising the at least one portion of the at least one privacy zone to authorized users; modifying the video stream to obfuscate the at least one portion of the at least one privacy zone; and transmitting the video stream in which the at least one portion of the at least one privacy zone is obfuscated to unauthorized users. In some embodiments, the authorized users are located within the portion of the medical facility and the unauthorized users are located outside the portion of the medical facility. In some embodiments, the transmitted video stream comprising the at least one portion of the at least one privacy zone to authorized users is located within the portion of the medical facility and the transmitted video stream in which the at least one portion of the at least one privacy zone is obfuscated is located outside the portion of the medical facility. In some embodiments, defining the at least one privacy zone comprises receiving a user input to define the at least one privacy zone. In some embodiments, the user input comprises selecting the at least one privacy zone on a display displaying a video stream of the portion of the medical facility. In some embodiments, defining the at least one privacy zone comprises receiving a user input associated with the at least one privacy zone and detecting one or more edges in the video stream, wherein the one or more edges provide a reference point to define the at least one privacy zone. In some embodiments, defining the at least one privacy zone comprises identifying a visual indicator in the video stream via image processing. In some embodiments, the visual indicator comprises a human face, a video display, or an object with written text. In some embodiments, the visual indicator comprises an infrared light. In some embodiments, the visual indicator comprises a quick-read code. In some embodiments, the at least one privacy zone is defined as a region centered around the visual indicator. In some embodiments, defining the at least one privacy zone comprises receiving a first input from one or more sensors of an object in the portion of the medical facility. In some embodiments, the object comprises a surgical table. In some embodiments, the first input corresponds to a position of a patient. In some embodiments, the first input corresponds to a position of the object within the portion of the medical facility.

In some embodiments, a system for maintaining patient privacy in a video of a portion of a medical facility includes one or more processors configured to: receive a first input; define, based on the first input, at least one privacy zone for the portion of the medical facility, wherein the at least one privacy zone is associated with patient privacy; receive a video stream generated by an image data source having a first perspective, wherein the video stream includes at least one portion of the at least one privacy zone; modify the video stream to obfuscate the at least one portion of the at least one privacy zone; transmit the video stream that includes at least one portion of the at least one privacy zone inside the portion of the medical facility; and transmit the video stream in which the at least one portion of the at least one privacy zone is obfuscated outside the portion of the medical facility. In some embodiments, the first input comprises selecting the at least one privacy zone on a display displaying a video stream of the portion of the medical facility. In some embodiments, defining the at least one privacy zone comprises receiving a first input associated with the at least one privacy zone and detecting one or more edges in the video stream, wherein the one or more edges provide a reference point to define the at least one privacy zone. In some embodiments, defining the at least one privacy zone comprises identifying a visual indicator in the video stream via image processing. In some embodiments, the visual indicator comprises a human face, a video display, or an object with written text. In some embodiments, the visual indicator comprises an infrared light. In some embodiments, the visual indicator comprises a quick-read code. In some embodiments, the at least one privacy zone is defined as a region centered around the visual indicator. In some embodiments, defining the at least one privacy zone comprises receiving the first input from one or more sensors of an object in the portion of the medical facility. In some embodiments, the object comprises a surgical table. In some embodiments, the first input corresponds to a position of a patient. In some embodiments, the first input corresponds to a position of the object within the portion of the medical facility.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

FIG. 2 depicts a flowchart representing an exemplary method for maintaining privacy, in accordance with some embodiments.

FIG. 3 depicts a flowchart representing an exemplary method for maintaining privacy, in accordance with some embodiments.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Disclosed herein are systems, methods, computer readable mediums, and techniques that may address one or more of the needs discussed above. Described herein are exemplary embodiments of system for maintaining patient privacy, which may address the problems and shortcomings of known systems and methods described above.

Figure 1:
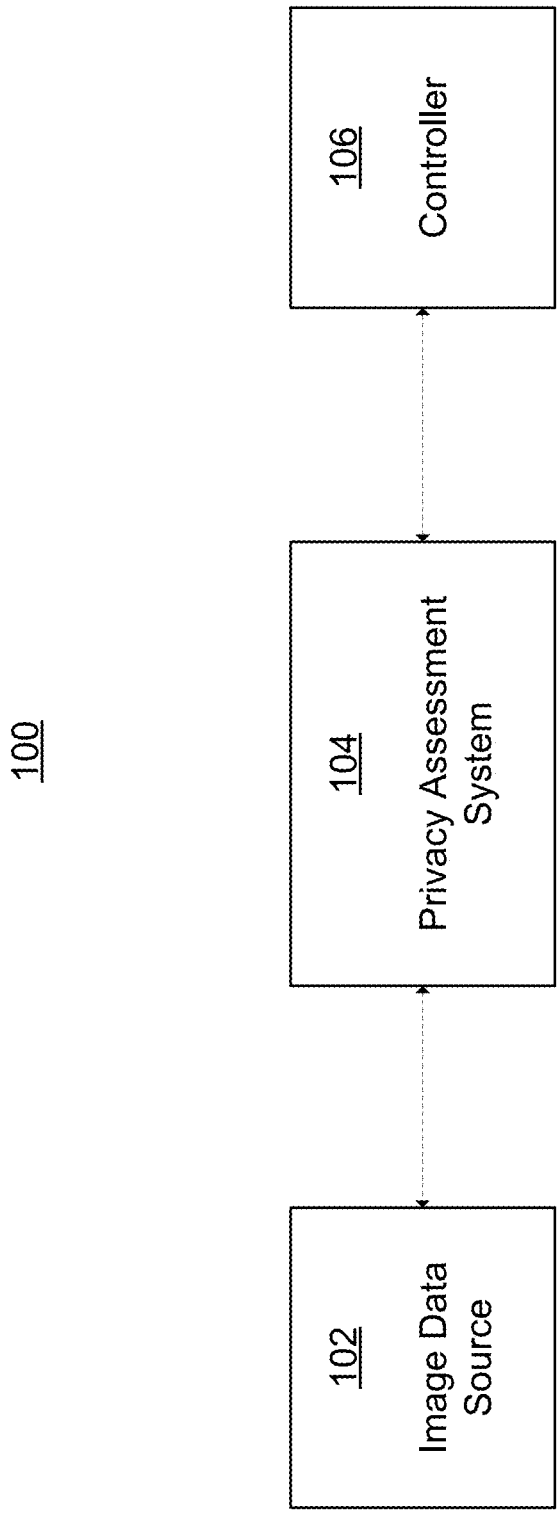
FIG. 1 depicts a system for maintaining patient privacy, in accordance with some embodiments.

FIG. 1 depicts a system 100 for maintaining patient privacy, in accordance with some embodiments.

As shown, system 100 may include image data source 102, privacy assessment system 104, and controller 106. Each of these components may be communicatively coupled with one another such that they may send and receive electronic information via network communication amongst one another. As shown in the example of FIG. 1, assessment system 104 may be communicatively coupled to both image data source 102 and to controller 106.

In some embodiments, image data source 102 may be any electronic source for medical or surgical images and/or video, such as an image capture device, a video capture device, an image-capture, image/video archive, and/or video-capture endoscope, an image or video broadcasting or relaying device, one or more servers, and/or one or more databases or repositories. Image data source 102 may be configured to transmit image data (e.g., monitoring/medical/surgical image data and/or monitoring/medical/surgical video data) to privacy assessment system 104 by any wired or wireless electronic communication medium, including by any suitable network communication protocol.

In some embodiments, privacy assessment system 104 may be any device or system comprising one or more computer processors configured to receive image data, assess and/or process the received image data, and to generate and transmit one or more output signals in accordance with the results of the image assessment. In some embodiments, assessment system 104 may be provided, in whole or in part, as all or part of a desktop computing device, laptop, tablet, mobile electronic device, dedicated medical image processing device, computing module, processor, server, cloud computing system, distributed computing system, or the like. In some embodiments, privacy assessment system 104 may be provided locally with respect to image data source 102 and/or controller 106 (e.g., in the surgical suite or other hospital room), while in some embodiments privacy assessment system 104 may be provided remotely from image data source 102 and/or controller 106 (e.g., outside the surgical suite, elsewhere in a hospital, at a remote server location, etc.).

In some embodiments, assessment system 104 may be configured to receive image data (e.g., image and/or video data showing an image or frame of video) from image data source 102 and to modify the image to obfuscate a privacy zone depicted in the image data received. In some embodiments, assessment system 104 may be configured to maintain patient privacy in accordance with the techniques discussed below with reference to FIGS. 2-3.

In some embodiments, assessment system 104 may be configured to send one or more instruction or control signals to image data source 102 configured to cause the image data source to limit the change in the perspective of the image data source such that a privacy zone is not in a field of view of the image data source; in some embodiments, as discussed in detail herein, the instruction or control signal may be sent by assessment system 104 in accordance with a defined privacy zone. For example, in some embodiments, if a user at a far end control of the image data source wanted to adjust the perspective of the image data source such that patient identity information (i.e., a privacy zone) would be in the field of view of the image data source, the privacy assessment system can prevent the image data source from adjusting the perspective of the camera such that the patient identity information is not in the field of view of the image data source or the privacy assessment system can modify the image to obfuscate the patient identity information from being visible in the field of view of the image data source.

In some embodiments, controller 106 may be any type of controller that can control an image data source, or the like, such as a far end control. In some embodiments, the controller can be controlled or limited in accordance with an instruction received from the privacy assessment system 104. In some embodiments, controller 106 may be wholly hardware, wholly software, or may comprise both hardware and software. In some embodiments, controller 106 may be a physical device, such as a joystick configured to move an image data source. In some embodiments, privacy assessment system 104 may be a software component, such as image processing software configured to process one or more images (including, for example, the images received from image data source 102 and analyzed to determine if a privacy zone or patient identity information is in the field of view of the image data source) to protect patient privacy.

As described herein, image data source 102 may be configured to be turned on or off or limited in the change of perspective in accordance with instructions, as determined by system 104. In some embodiments, controller 106 may be configured to be turned on or off or limited in accordance with instructions, as determined by system 104. In some embodiments, system 104 can ignore control inputs from controller 106, as determined by system 104. In some embodiments, controller 106 may be configured to receive instruction signals and/or control signals from the privacy assessment system 104 by any wired or wireless electronic communication medium, including by any suitable network communication protocol.

FIG. 2 depicts a flowchart representing an exemplary method 200 for maintaining patient privacy, in accordance with some embodiments. As described below in detail, method 200 may enable a patient privacy management system to define a privacy zone for a medical facility, capture a video that includes at least one portion of the privacy zone, modify the video to obfuscate the at least one portion of the privacy zone, and display/transmit the video in which the at least one portion of the at least one privacy zone is obfuscated.

In some embodiments, method 200 may be carried out, in whole or in part, by one or more of the components of a system for maintaining patient privacy, such as system 100 described above with respect to FIG. 1. In some embodiments, any one or more of the aspects of method 200 may be combined, in whole or in part, with any one or more of the aspects of FIG. 1, and/or with any one or more of the systems, methods, devices, and/or techniques described elsewhere herein. The same can be said about method 300 and FIG. 1 as discussed later on.

At block 202, in some embodiments, the system may define at least one privacy zone for a portion of a medical facility, wherein the at least one privacy zone is associated with patient privacy. Examples of medical facilities include hospitals, doctor offices, or other various medical treatment locations. The portions of these medical facilities can include rooms (e.g., operating room) or areas where patients are receiving medical treatment. The privacy zone can be any area that contains patient identity information. Examples of privacy zones include the patient's face, displays containing patient identity information (e.g., vitals displays), and/or objects containing patient identity information (e.g., papers with text, white or grease boards with text, patient's hospital bracelet, electronic status boards, diagnostic imaging displays, any loose documentation, etc.).

In some embodiments, defining the at least one privacy zone can include receiving an input to define the at least one privacy zone. In some embodiments, the input can be user input. This user input can include selecting at least one privacy zone on a display that is displaying a video stream for a portion of a medical facility. As such, the system can display and/or transmit a video stream for a portion of the medical facility. For example, a doctor can be viewing a video stream of an operating room and can select the portions of the operating room that include patient identity/privacy information such as the patient's face. The areas that the user selects can define the privacy zone(s) in that portion of the medical facility. In some embodiments, the user may change the perspective (e.g., pan, tilt, zoom) of the imaging device to change the field of view of the imaging device to further define the privacy zone or add additional privacy zones. In other words, the user can control the image data source such that more or different portions of the medical facility are transmitted/displayed. The user can then further define a privacy zone or add additional privacy zones.

In some embodiments, defining the at least one privacy zone includes receiving a user input associated with the at least one privacy zone and detecting one or more edges in the video stream, wherein the one or more edges provide a reference point to define the at least one privacy zone. As such, the privacy assessment system can detect the one or more edges in the video received from the image data source. In some embodiments, these one or more edges can define a privacy zone itself. For example, the one or more edges detected by the system can be the edges of a display screen, a clipboard, a white or grease board, etc. In some embodiments, as stated above, the one or more edge can provide a reference point to define at least one privacy zone. As such, privacy zones can be a region (i.e., shaped region such as rectangular, square, circular, oval, etc.) of a certain size (for example, a certain number of degrees) to a direction (e.g., left, right, top, bottom) of at least one edge. In some embodiments, the image data source can see edges fairly well, and it can remember edges and use them as reference points or landmarks. The obfuscation zones can be defined in reference to these edges and then as the image data source's field of view changes (i.e., as the camera moves around), the system can continue to collate a map of the edges and use those as its coordinate system.

In some embodiments, defining the at least one privacy zone can include identifying a visual indicator in the video stream. In some embodiments, the assessment system can identify the visual indicator in the video stream via image processing. In some embodiments, the visual indicator includes a human face, a display (e.g., vitals displays), or any object with patient identification information (e.g., white or grease board with text, patient identification wrist band, clipboard or paper with text, text overlays on an endoscopic video source, etc.). In some embodiments, the visual indicator can be an infrared light and/or a quick read (QR) code. In some embodiments, the privacy zone can be defined based on the visual indicator (e.g., around or offset from the visual indicator). For example, the assessment system can receive video from an image data source and the assessment system can identify a QR code in the video and define a privacy zone as a region around the QR code. In some embodiments, the privacy zone can be a region centered or offset around the visual indicator. In some embodiments, the region can be a shaped (e.g., circular, rectangular, square, etc.) region around the visual indicator. In some embodiments, the visual indicator can provide a reference point for defining the privacy zone. As such, privacy zones can be a region (e.g., define shaped region such as rectangular, square, circular, oval, etc.) of a certain size offset in a given direction (e.g., left, right, top, bottom) from the visual indicator.

In some embodiments, defining the at least one privacy zone includes receiving a first input from one or more sensors of an object in the portion of the medical facility. In some embodiments, the object can be a surgical table, display monitor, objects with patient information, etc. In some embodiments, the first input can correspond to a position of a patient. In some embodiments, the first input corresponds to a position of an object within the portion of the medical facility. In some embodiments, the object can be communicatively coupled (wirelessly or wired) to the privacy assessment system. The object can send inputs/signals to the assessment system corresponding to locations where patient private information may be contained. For example, a surgical table can send an input/signal to the assessment system corresponding to a patient's head on the surgical table in the medical facility. The system can then define at least one privacy zone in the area of the surgical table where the patient's head is located.

At block 204, in some embodiments, the system may receive image data captured/generated by the image data source 102, wherein the image data includes the portion of the medical facility. In some embodiments, the system can receive image data captured/generated from by the image data source, wherein the image data includes at least one portion of the at least one privacy zone (if the privacy zone has already been defined). In the example of system 100, privacy assessment system 104 may receive image data representing an image (could also be video) of a medical facility or portion thereof from image data source 102. The image of the medical facility or portion thereof can include at least one portion of the at least one privacy zone. The image data received by the system may be in the form of a still image, one or more frames of a video image, or a video stream/feed and may depict a portion of a medical facility that includes at least one portion of the at least one privacy zone. The image data may be received from an image or video capture device, an image or video broadcasting or relaying device, one or more servers, and/or one or more databases or repositories. The image data received may be received via any suitable form of electronic communication, including wired and/or wireless network communication.

In some embodiments, the system may perform one or more image pre-processing techniques on the received image data. For example, the system may perform cropping, alignment, and/or re-sizing (e.g., scaling) of the received image data before additional processing steps are performed. In some embodiments, more than one of the image pre-processing techniques may be performed on the same image data. For example, a single image frame may be subject to any two or more image preprocessing techniques before proceeding to the image processing techniques discussed below. In some embodiments, no image preprocessing techniques may be employed (e.g., the raw image data initially received may be used for the image processing steps described below).

At block 206, in some embodiments, the system can modify the image data to obfuscate the at least one portion of the at least one privacy zone. "Obfuscate" as defined herein means to render image data obscure, unclear, or unintelligible such that a person viewing the obscured image data cannot make out any patient identity information in the obscured image data. In some embodiments, the image data is obfuscated by pixelating or scrambling the privacy zone(s) of the image data. As such, the privacy assessment system can allow for image data feeds/stream (e.g., video feeds/streams) with patients included in the image data (e.g., video frame) to be anonymized via obfuscation to protect the patient's identity. The system can also protect health care providers' identities as well. Accordingly, everything the system can do to protect patient identity information (i.e., all PII and PHI) can also be applied to health care provider information.

As discussed above, in some embodiments, the system can define a privacy zone. For example, the system can recognize human faces using known pattern recognition techniques, artificial intelligence, etc. and obfuscate the human's facial features in real time to anonymize the video stream prior to display or recording. In some embodiments, the system can modify the image data received such that the privacy zones previously defined are obfuscated in real time (using video processing techniques) even if the privacy zone moves within the frame, prior to display or recording. For example, the privacy zone can be defined as a clipboard (i.e., an object) that contains patient identity information. This clipboard may move about a portion of the medical facility while the patient receives medical treatment. As such, the system can utilize known algorithms for recognizing objects within the camera frame and obfuscate the specified objects even if they move within the frame in real time.

Figure 4A:
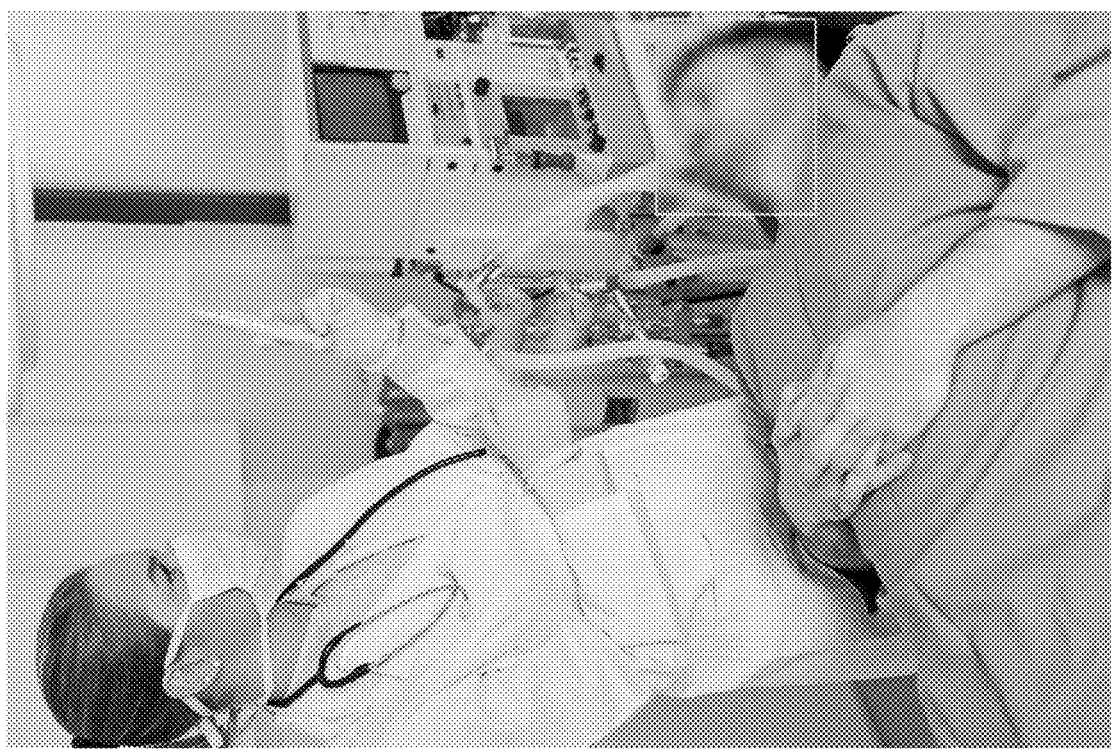
FIG. 4A shows an example of a camera video stream of a patient care environment with real-time obfuscation of patient identity.
Figure 4B:
FIG. 4B shows an example of a camera video stream of a patient care environment with real-time obfuscation of patient identity and healthcare provide identity.

At block 208, in some embodiments, the system can transmit the image data in which the at least one portion of the at least one privacy zone is obfuscated to a display. In some embodiments, the image data in which the at least one portion of the at least one privacy zone is obfuscated can be displayed on a display. Examples of camera video streams of a portion of a medical facility is shown in FIGS. 4A-B. As shown in FIG. 4A, the privacy zone was defined as the patient's face and the system has obfuscated the patient's identity (e.g., face) such that the video stream does not show the patient's face when it is transmitted to a display. In FIG. 4B, the privacy zone was defined as the patient's face and the health care provider's face and the system has obfuscated the patient's identity (e.g., face) and health care provider's identity (e.g., face) such that the video stream does not show the patient's face or healthcare provider's face when it is transmitted to a display.

In some embodiments, persons such as the patient's healthcare providers need access to the image data. For example, a health care provider can be performing an endoscopic procedure on the patient and the health care provider would like to see an unobfuscated view of the video from the endoscope. As the patient's health care provider, he is allowed access to the patient's identity information. As such, the patient's health care provider can be an authorized user of the system who is allowed access to the patient's identity information. For authorized users, the system can transmit image data that includes the at least one portion of the at least one privacy zone to a display. In some embodiments, the authorized user can provide an input to the system to identify himself/herself as an authorized user. In some embodiments, the input can be from the controller 106. For unauthorized users, the system can transmit image data in which the at least one portion of the at least one privacy zone is obfuscated. As such, within an operating room, the healthcare provider may not want any of the video displayed on the monitors in the room to have obfuscation on them, but those same video feeds when sent out of the room, or when recorded and stored, do have obfuscation. In some embodiments, within an operating room, the system can automatically know which displays/monitors are where, and having pre-approval to display non-obfuscated images on those given displays/monitors.

In some embodiments, the authorized users can be located within the portion of the medical facility and the unauthorized users can be located outside the portion of the medical facility. In some embodiments, the displayed image data including the at least one portion of the at least one privacy zone to authorized users can be located within the portion of the medical facility and the displayed image data in which the at least one portion of the at least one privacy zone is obfuscated can be located outside the portion of the medical facility.

FIG. 3 depicts a flowchart representing an exemplary method 300 for maintaining patient privacy, in accordance with some embodiments. As described below in detail, method 300 may enable a patient privacy management system to define a privacy zone for a medical facility, receive image data from an image data source having a first perspective, receive a user input corresponding to a remotely controlled change in the perspective of the image data source to a second perspective, and limit the change in the perspective of the image data source based on the defined at least one privacy zone so that the at least one privacy zone is not in a field of view of the image data source.

In some embodiments, method 300 may be carried out, in whole or in part, by one or more of the components of a system for maintaining patient privacy, such as system 100 described above with respect to FIG. 1. In some embodiments, any one or more of the aspects of method 300 may be combined, in whole or in part, with any one or more of the aspects of FIG. 1, and/or with any one or more of the systems, methods, devices, and/or techniques described elsewhere herein.

At block 302, in some embodiments, the system may define at least one privacy zone for a portion of a medical facility, wherein the at least one privacy zone is associated with patient privacy. All embodiments and discussion related to step 202 of method 200 are applicable to step 302 of method 300. In some embodiments, the system can receive a user input and the at least one privacy zone can be based on the user input as described above. In some embodiments, the user input can correspond to a range of motion of the image data source.

In some embodiments, the image data source (i.e., camera) can have far end controls. In some embodiments, a user of the system can define at least one privacy zone where far side controls cannot position the image data source such that the field of view of the data source does not include the at least one privacy zone. As such, the user at the far end of the controls can only adjust/move the image data source within defined parameters such that the field of view of the data source does not include the at least one privacy zone.

At block 304, in some embodiments, the system can receive image data from an image data source having a first perspective, wherein a perspective of the image data source can be remotely controlled. In some embodiments, remotely controlling the image data source can be referring to far end camera control. All embodiments and discussion related to step 204 of method 200 of receiving image data from an image data source are applicable to step 304 of method 300. In some embodiments, the image data source can be a PTZ camera. As such, the perspective that can be changed can be a panned position of the image data source, a tilt position of the image data source, or a zoom range of the image data source.

At block 306, in some embodiments, the system can receive a user input corresponding to a remotely controlled change in the perspective of the image data source to a second perspective. In some embodiments, the input can be received by controller 106. In some embodiments, the input can be a computer input, a joystick input, or any other type of input that can be used to adjust a perspective of an image data source. For example, a user can turn a joystick to send a signal to a PTZ camera to rotate, pan, tilt, or zoom the camera in a certain direction.

At block 308, in some embodiments, the system can limit the change in the perspective of the image data source based on the defined at least one privacy zone so that the at least one privacy zone is not in a field of view of the image data source. For example, a user at a remote location may want to change the image data source (e.g.,) such that they can see another portion of the medical facility. As such, the user may provide an input that would cause the camera to pan left to see what is to the left of the field of view of the camera. However, to the left of the field of view of the camera is the patient himself which has already been previously defined as a privacy zone for the medical facility. Accordingly, the assessment system can limit the panning of the camera to the left such that it will not pan left to have privacy zone (i.e., the patient) in the field of view of the camera. This same logic can be applied to tilting, zooming, and other requests to change the perspective of an image data source.

In some embodiments, the image data source may have a stepper motor(s) or servomotor(s) that can be used to move the image data source around. The stepper motor(s) or servomotor(s) can be electrically driven to very well-defined increments. As such, one method of limiting the change in the perspective of the image data source is to get feedback from either the gears, the motors, position sensor, counting steps, or something that can tell you where the image data source is pointing, and then use some simple geometry to be able to determine where a privacy zone is and then remember that privacy zone as the image data source pans, tilts, or zooms around. In some embodiments, the system can limit the change in the perspective of the image data source based on the use of edge detection and defining the privacy zones described herein.

In some embodiments, the image data source can include a high density image sensor that allows for a view of the portion of the medical facility being monitored. Subsampling of the image sensor array in the horizontal and the vertical directions can provide forms of digital panning, zooming, and/or tilting. Similarly, subsampling smaller arrays of the image sensor can provide a form of digital zooming in while subsampling larger arrays of the image sensor can provide a form of digital zooming out. As such, one method of limiting the change in perspective of the image data source can be to prevent sub sampling in regions of the image sensor based on the defined at least one privacy zone so that the at least one privacy zone is not in a field of view of the image data source.

In some embodiments, the system can display the image data from the first perspective and receive a user input corresponding to a region of the image data. This region of the image data can define the at least one privacy zone.

In some embodiments, the system can determine whether the user input is received from an authorized user or an unauthorized user (as described above); and limiting the change in the perspective of the imaging device based on the defined at least one privacy zone so that the at least one privacy zone is not in a field of view of the imaging device in response to determining that the user input is received from an unauthorized user. In some embodiments, the limiting the change in perspective includes limiting a panning range of the image data source. In some embodiments, limiting the change in perspective includes limiting a tilting range of the image data source. In some embodiments, limiting the change in perspective includes limiting a zoom range of the image data source.

Figure 5:
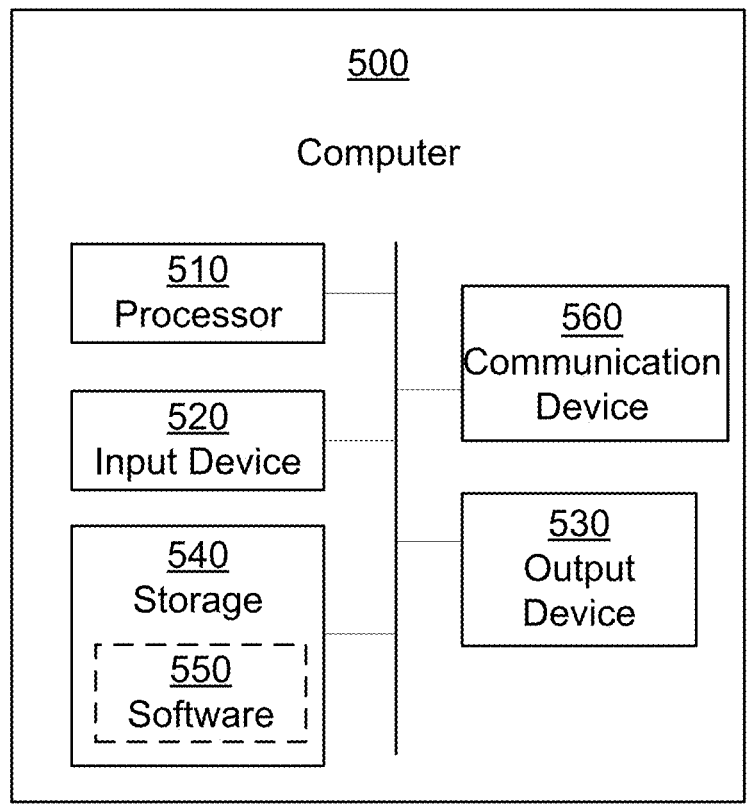
FIG. 5 depicts a computer, in accordance with some embodiments.

FIG. 5 illustrates a computer, in accordance with some embodiments. Computer 500 can be a component of a system for maintaining patient privacy, such as system 100 and/or any of its subcomponents described above with respect to FIG. 1. In some embodiments, computer 500 may be configured to execute a method for maintaining patient privacy, such as all or part of methods 200 and 300 described above with respect to FIGS. 2-3.

Computer 500 can be a host computer connected to a network. Computer 500 can be a client computer or a server. As shown in FIG. 5, computer 500 can be any suitable type of microprocessor-based device, such as a personal computer; workstation; server; or handheld computing device, such as a phone or tablet. The computer can include, for example, one or more of processor 510, input device 520, output device 530, storage 540, and communication device 560.

Input device 520 can be any suitable device that provides input, such as a touch screen or monitor, keyboard, mouse, or voice-recognition device. Output device 530 can be any suitable device that provides output, such as a touch screen, monitor, printer, disk drive, or speaker.

Storage 540 can be any suitable device that provides storage, such as an electrical, magnetic, or optical memory, including a RAM, cache, hard drive, solid state drive, CD-ROM drive, tape drive, or removable storage disk. Communication device 560 can include any suitable device capable of transmitting and receiving signals over a network, such as a network interface chip or card. The components of the computer can be connected in any suitable manner, such as via a physical bus or wirelessly. Storage 540 can be a non-transitory computer-readable storage medium comprising one or more programs, which, when executed by one or more processors, such as processor 510, cause the one or more processors to execute methods described herein, such as all or part of methods 200 and 300 described above with respect to FIGS. 2-3.

Software 550, which can be stored in storage 540 and executed by processor 510, can include, for example, the programming that embodies the functionality of the present disclosure (e.g., as embodied in the systems, computers, servers, and/or devices as described above). In some embodiments, software 550 can be implemented and executed on a combination of servers such as application servers and database servers.

Software 550 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 500 can implement any operating system suitable for operating on the network. Software 550 can be written in any suitable programming language, such as C, C++, C#, Java, or Python. In various embodiments, application software embodying the functionality of the present disclosure can be deployed in different configurations, such as in a client/server arrangement or through a Web browser as a Web-based application or Web service, for example.

Additional Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. A method of maintaining patient privacy in video of a portion of a medical facility, the method comprising:
    defining at least one privacy zone for the portion of the medical facility, wherein the at least one privacy zone comprises an object with text comprising patient identity information;
    capturing, via an image data source, a video stream of the portion of the medical facility that includes at least one portion of the at least one privacy zone;
    detecting one or more edges of the object with text comprising patient identity information in the video stream of the portion of the medical facility;
    modifying the video stream to obfuscate the at least one portion of the at least one privacy zone, wherein the one or more edges of the object with text comprising patient identity information provide a reference point to define the at least one portion of the at least one privacy zone that is obfuscated; and
    transmitting the video stream in which the at least one portion of the at least one privacy zone is obfuscated.

2. The method of claim 1, wherein defining the at least one privacy zone comprises receiving a user input to define the at least one privacy zone.

3. The method of claim 2, wherein the user input comprises selecting the at least one privacy zone on a display displaying a video stream of the portion of the medical facility.

4. The method of claim 1, wherein defining the at least one privacy zone comprises identifying a visual indicator in the video stream via image processing.

5. The method of claim 4, wherein the visual indicator comprises an infrared light.

6. The method of claim 4, wherein the visual indicator comprises a quick-read code.

7. The method of claim 4, wherein the at least one privacy zone is defined as a region centered around the visual indicator.

8. The method of claim 1, wherein defining the at least one privacy zone comprises receiving a first input from one or more sensors of an object in the portion of the medical facility.

9. The method of claim 8, wherein the object comprises a surgical table.

10. The method of claim 8, wherein the first input corresponds to a position of a patient.

11. The method of claim 8, wherein the first input corresponds to a position of the object within the portion of the medical facility.

12. The method of claim 1, wherein the object with text comprises a white board, grease board, patient bracelet, clipboard, or paper.

13. A method of maintaining patient privacy in video of a portion of a medical facility, the method comprising:
    defining at least one privacy zone for the portion of the medical facility, wherein the at least one privacy zone comprises an object with text comprising patient identity information;
    generating a video stream of the portion of the medical facility via an image data source from a first perspective, wherein a perspective of the image data source can be remotely controlled;
    detecting one or more edges of the object with text comprising patient identity information in the video stream of the portion of the medical facility;
    receiving a first user input corresponding to a remotely controlled change in the perspective of the image data source to a second perspective;
    limiting the change in the perspective of the image data source based on the defined at least one privacy zone so that the at least one privacy zone is not in a field of view of the image data source, wherein the one or more edges of the object with text comprising patient identity information provide a reference point to define the at least one privacy zone.

14. The method of claim 13, the method further comprising receiving a second user input, and wherein the at least one privacy zone is defined based on the second user input.

15. The method of claim 14, wherein the second user input corresponds to a range of motion of the image data source.

16. The method of claim 14, the method further comprising displaying the video stream from the first perspective, wherein the user second input corresponds to a region of the video stream.

17. The method of claim 13, the method further comprising determining whether the first user input is received from an authorized user or an unauthorized user; and
    limiting the change in the perspective of the image data source based on the defined at least one privacy zone so that the at least one privacy zone is not in a field of view of the image data source in response to determining that the first user input is received from an unauthorized user.

18. The method of claim 13, wherein limiting the change in perspective comprises limiting a panning range of the image data source.

19. The method of claim 13, wherein limiting the change in perspective comprises limiting a tilting range of the image data source.

20. The method of claim 13, wherein limiting the change in perspective comprises limiting a zoom range of the image data source.

21. A method of maintaining patient privacy in a video of a portion of a medical facility, the method comprising:
    defining at least one privacy zone for the portion of the medical facility, wherein the at least one privacy zone comprises an object with text comprising patient identity information;
    capturing, via an image data source having a perspective, a video stream of the portion of the medical facility that includes at least one portion of the at least one privacy zone;
    detecting one or more edges of the object with text comprising patient identity information in the video stream of the portion of the medical facility;
    transmitting the video stream comprising the at least one portion of the at least one privacy zone to authorized users;

modifying the video stream to obfuscate the at least one portion of the at least one privacy zone, wherein the one or more edges of the object with text comprising patient identity information provide a reference point to define the at least one portion of the at least one privacy zone that is obfuscated; and transmitting the video stream in which the at least one portion of the at least one privacy zone is obfuscated to unauthorized users.

22. The method of claim 21, wherein the authorized users are located within the portion of the medical facility and the unauthorized users are located outside the portion of the medical facility.

23. The method of claim 21, wherein the transmitted video stream comprising the at least one portion of the at least one privacy zone to authorized users is located within the portion of the medical facility and the transmitted video stream in which the at least one portion of the at least one privacy zone is obfuscated is located outside the portion of the medical facility.

* * * * *